United States Patent
Chen et al.

(10) Patent No.: US 10,181,320 B2
(45) Date of Patent: Jan. 15, 2019

(54) COMPUTER-IMPLEMENTED METHOD AND APPARATUS FOR GENERATING GRAPHEME-TO-PHONEME MODEL

(71) Applicant: BAIDU ONLINE NETWORK TECHNOLOGY (BEIJING) CO., LTD., Beijing (CN)

(72) Inventors: Zhijie Chen, Beijing (CN); Yongguo Kang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 168 days.

(21) Appl. No.: 15/391,907

(22) Filed: Dec. 28, 2016

(65) Prior Publication Data
US 2017/0243575 A1    Aug. 24, 2017

(30) Foreign Application Priority Data
Feb. 24, 2016 (CN) .......................... 2016 1 0102345

(51) Int. Cl.
*G06N 3/04*      (2006.01)
*G06N 3/08*      (2006.01)
(Continued)

(52) U.S. Cl.
CPC ........ *G10L 15/063* (2013.01); *G06F 17/2217* (2013.01); *G06N 3/04* (2013.01);
(Continued)

(58) Field of Classification Search
CPC ....... G10L 15/063; G10L 15/02; G10L 15/16; G10L 13/00; G10L 2015/025; G06F 17/2217; G06N 3/04; G06N 3/08
(Continued)

(56) References Cited

U.S. PATENT DOCUMENTS 6,437,804 B1 *  8/2002  Ibe ........................ G06F 17/509
                                                        709/223
9,595,002 B2 *  3/2017  Leeman-Munk .... G06N 3/0445
(Continued)

FOREIGN PATENT DOCUMENTS

KR      20160012537 A      2/2016

OTHER PUBLICATIONS

Korean Patent Application No. 20170018757, Office Action dated Jan. 29, 2018, 5 pages.
(Continued)

*Primary Examiner* — Ly D Pham
(74) *Attorney, Agent, or Firm* — Lathrop Gage LLP

(57) ABSTRACT

A method and an apparatus for generating a g2p model based on AI are provided. The method includes: during performing a grapheme-to-phoneme conversion training by a neural network on each word in training data, screening nodes in a hidden layer of the neural network randomly according to a preset node ratio so as to obtain retaining nodes for training each word; training each word with a sub-neural network corresponding to the retaining nodes and updating a weight of each retaining node of the sub-neural network; and performing a mean processing on the weights of the retaining nodes of respective sub-neural networks, so as to generate the grapheme-to-phoneme model.

9 Claims, 2 Drawing Sheets

(51) Int. Cl.
*G10L 15/02* (2006.01)
*G10L 15/06* (2013.01)
*G10L 15/16* (2006.01)
*G06F 17/22* (2006.01)
*G10L 13/00* (2006.01)

(52) U.S. Cl.
CPC ............... *G06N 3/08* (2013.01); *G10L 15/02* (2013.01); *G10L 15/16* (2013.01); *G10L 13/00* (2013.01); *G10L 2015/025* (2013.01)

(58) Field of Classification Search
USPC .......................................................... 706/25
See application file for complete search history.

(56) References Cited

U.S. PATENT DOCUMENTS

| | | | | |
|---|---|---|---|---|
| 9,697,820 B2* | 7/2017 | Jeon | ......................... | G10L 13/07 |
| 9,858,529 B2* | 1/2018 | Adams | ................... | G06N 7/005 |
| 9,934,775 B2* | 4/2018 | Raitio | ..................... | G10L 13/10 |
| 2006/0180371 A1* | 8/2006 | Breed | .................... | G07C 5/008 |
| | | | | 180/197 |
| 2014/0201126 A1* | 7/2014 | Zadeh | .................... | G06K 9/627 |
| | | | | 706/52 |
| 2015/0294245 A1* | 10/2015 | Nagar | ................. | G06Q 10/063 |
| | | | | 705/7.11 |
| 2015/0324690 A1* | 11/2015 | Chilimbi | ................ | G06N 3/063 |
| | | | | 706/25 |
| 2016/0063372 A1* | 3/2016 | Choudhury | .......... | G06N 3/0436 |
| | | | | 706/20 |
| 2016/0239581 A1* | 8/2016 | Jaidka | ............... | G06F 17/30719 |
| 2017/0154258 A1* | 6/2017 | Liu | ...................... | G06N 3/0445 |
| 2018/0204111 A1* | 7/2018 | Zadeh | ................. | G06N 3/0454 |

OTHER PUBLICATIONS

Korean Patent Application No. 20170018757, English translation of Office Action dated Jan. 29, 2018, 3 pages.

Rao, Kanishka et al, "Grapheme-to-Phoneme Conversion Using Long Short-Term Memory Recurrent Neural Networks", ICASSP 2015, pp. 4225-4229, 2015.

* cited by examiner

COMPUTER-IMPLEMENTED METHOD AND APPARATUS FOR GENERATING GRAPHEME-TO-PHONEME MODEL

CROSS-REFERENCE TO RELATED APPLICATIONS

This application is based on and claims a priority to Chinese Patent Application No. 201610102345.7, filed on Feb. 24, 2016, the entire content of which is incorporated herein by reference.

FIELD

Embodiments of the present disclosure generally relate to artificial intelligence technology, and more particularly, to a computer-implemented method and a computer-implemented apparatus for generating a grapheme-to-phoneme (g2p) model.

BACKGROUND

Artificial intelligence (AI for short) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc. The most important aspect of the artificial intelligence is the speech recognition technology.

The g2p model is very important in English speech synthesis, which is used to convert graphemes in received words to phonemes. In the related art, the g2p model is trained by deep neural network technology, which may obtain better effect than that based on statistical language models.

The objective of the g2p model is to convert a word to a phoneme sequence, and the number of real words is relatively fixed, i.e., about one hundred thousand. However, the amount of data required for training the g2p model is relatively fixed. The process of training the g2p model with the deep neural network is entirely different from the process of the acoustic model training.

During training the acoustic model with the neural network, the number of layers of the neural network and the number of units in each layer can be increased constantly, since the training data can be added constantly. However, for the training of the g2p model, if the number of layers of the neural network and the number of units in each layer are increased but the amount of the training data is relatively fixed, it is easy to cause an over-fit phenomenon. If the over-fit phenomenon occurs, the g2p model obtained by training has a good performance on training data but has a relative poorer performance on test data than the performance on the training data.

However, if a smaller network is used to train the g2p model, the g2p model with a relatively acceptable performance can be obtained. However, for this kind of g2p model, the number of layers of the network and the number of units in each layer are relatively smaller, and the learning capability and the generalization capability of the g2p model are not as good as that obtained by using the deep neural network.

SUMMARY

Embodiments of the present disclosure provide a computer-implemented method for generating a g2p model based on AI. The method includes: during performing a grapheme-to-phoneme conversion training by a neural network on each word in training data, screening nodes in a hidden layer of the neural network randomly according to a preset node ratio so as to obtain retaining nodes for training each word; training each word with a sub-neural network corresponding to the retaining nodes and updating a weight of each retaining node of the sub-neural network; and performing a mean processing on the weights of the retaining nodes of respective sub-neural networks, so as to generate the grapheme-to-phoneme model.

Embodiments of the present disclosure provide a computer-implemented apparatus for generating a g2p model based on AI. The apparatus includes: a processing module, configured to screen nodes in a hidden layer of a neural network randomly according to a preset node ratio so as to obtain retaining nodes for training each word, during performing a grapheme-to-phoneme conversion training by the neural network on each word in training data; a training module, configured to train each word with a sub-neural network corresponding to the retaining nodes and to update a weight of each retaining node of the sub-neural network; and a generating module, configured to perform a mean processing on the weights of the retaining nodes of respective sub-neural networks, so as to generate the grapheme-to-phoneme model.

Embodiments of the present disclosure provide a non-transitory computer-readable storage medium having stored therein instructions that, when executed by a processor of a device, causes the device to perform a computer-implemented method for generating a grapheme-to-phoneme model based on artificial intelligence, the computer-implemented method including: during performing a grapheme-to-phoneme conversion training by a neural network on each word in training data, screening nodes in a hidden layer of the neural network randomly according to a preset node ratio so as to obtain retaining nodes for training each word; training each word with a sub-neural network corresponding to the retaining nodes and updating a weight of each retaining node of the sub-neural network; and performing a mean processing on the weights of the retaining nodes of respective sub-neural networks, so as to generate the grapheme-to-phoneme model.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
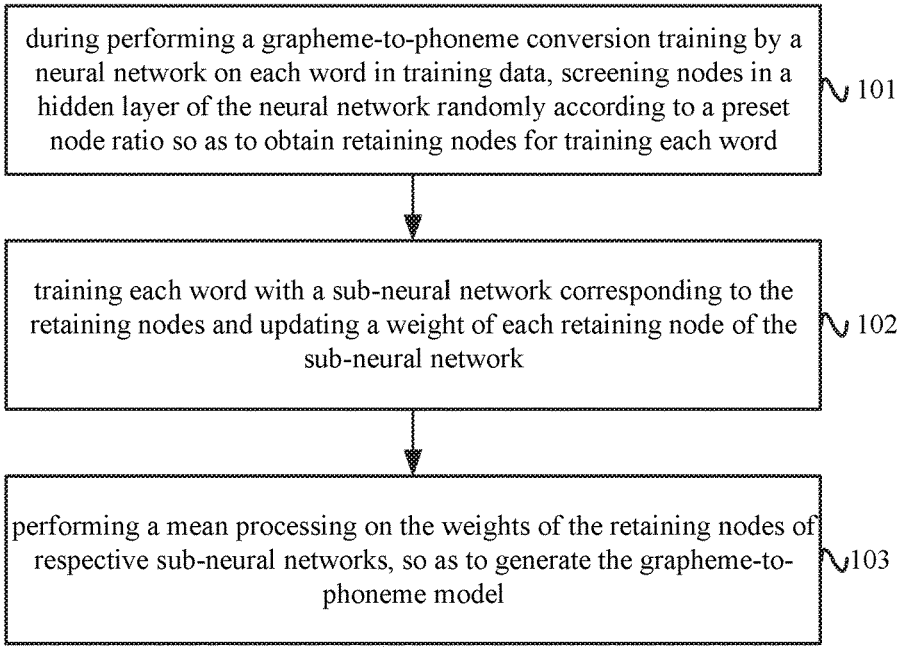
FIG. 1 is a flow chart of a computer-implemented method for generating a g2p model based on AI according to an embodiment of the present disclosure.

Reference will be made in detail to embodiments of the present disclosure. Examples of the embodiments are shown in the drawings, and the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure. In contrast, the present disclosure may include alternatives, modifications and equivalents within the spirit and scope of the appended claims.

FIG. 1 is a flow chart of a computer-implemented method for generating a g2p model based on AI according to an embodiment of the present disclosure. As shown in FIG. 1, the method includes followings.

At block 101, during performing a g2p conversion training by a neural network on each word in training data, nodes in a hidden layer of the neural network are screened randomly according to a preset node ratio, so as to obtain retaining nodes for training each word.

At block 102, each word is trained with a sub-neural network corresponding to the retaining nodes, and a weight of each retaining node of the sub-neural network is updated.

At block 103, a mean processing is performed on the weights of the retaining nodes of respective sub-neural networks, so as to generate the g2p model.

Specifically, in order to make the g2p model obtained by training have a stronger generalization capability, embodiments of the present disclosure adopts the deep neural network for training the g2p model. Moreover, during performing the g2p conversion training by the neural network on each word in the training data, a portion of nodes in the network are hidden, thus avoiding the over-fit of the model.

It should be noted that, the g2p model is generated by training data with the neural network whose nodes are hidden dynamically, and the g2p model generated is without the over-fit phenomenon. The neural network used for training is the deep neural network, which may use different models in different training scenes, and will not be elaborated herein. For example, the LSTM (Long-Short Term Memory) neural network may be used.

The deep neural network has 3 layers, in which the first layer is an input layer, the last layer is an output layer, and the middle layer is the hidden layer. Some neural networks have only one hidden layer, and some neural networks have more than one hidden layers, each layer having nodes. According to the number of words in the training data, the size of the deep neural network used for training may be adjusted adaptively, including adjusting the number of layers in the deep neural network and adjusting the number of nodes in each layer.

In embodiments of the present disclosure, in order to avoid the over-fit of the model, during each process of training the input word, the nodes in the hidden layer of the neural network are screened randomly according to the preset node ratio, thus obtaining the retaining nodes for training each word.

It should be noted that, the node ratio reflects the simplification degree of the deep neural network in the training process, and before the training, the number of layers in the neural network, the number of nodes in each layer, and the preset node ratio may be adjusted according to the number of words in the training data.

It should be noted that, in different application scenarios, different types of node ratio may be adopted for screening the nodes in the hidden layer of the neural network randomly, which are illustrated as follows.

Example One: Hiding Ratio of Nodes

Specifically, according to the preset hiding ratio of nodes, a portion of nodes in each hidden layer of the neural network are hidden randomly, in which the number of the nodes hidden corresponds to the preset hiding ratio of nodes. Further, the nodes which are not hidden in each hidden layer are used as the retaining nodes for training each word.

Example Two: Retaining Ratio of Nodes

According to the preset retaining ratio of nodes, a portion of nodes in each hidden layer of the neural network are retained randomly and used as the retaining nodes for training each node, in which the number of the nodes retained corresponds to the preset retaining ratio of nodes.

Further, each word is trained with the sub-neural network corresponding to the retaining nodes, and the weigh of each retaining node of the sub-neural network is updated.

In other words, during the model training, the hidden nodes (non-retaining nodes) are not used, but the weight for each hidden node is retained, only not updated during this training. During the next training, some nodes in the hidden layer are hidden again and randomly according to a certain ration, this cycle. In this way, the over-fit can be prevented, this is because, the network actually used in each training is relatively smaller than the original network, and this small network basically does not occur the over-fit phenomenon.

Finally, the mean processing is performed on the weights of the retaining nodes of all the sub-neural networks, thus generating the g2p model.

It can be understood that, by hiding different nodes randomly in respective trainings, a plurality of small networks are obtained actually, and thus the final result can be regarded as a mean of these small networks, which is an effective way to avoid the over-fit. It should be noted that, the hidden nodes described above are not deleted in practice, only not used in the present training, but will be used in the next training.

For clearer description of the above process, illustration will be made with reference to FIGS. 2 and 3 as follows.

Figure 2:
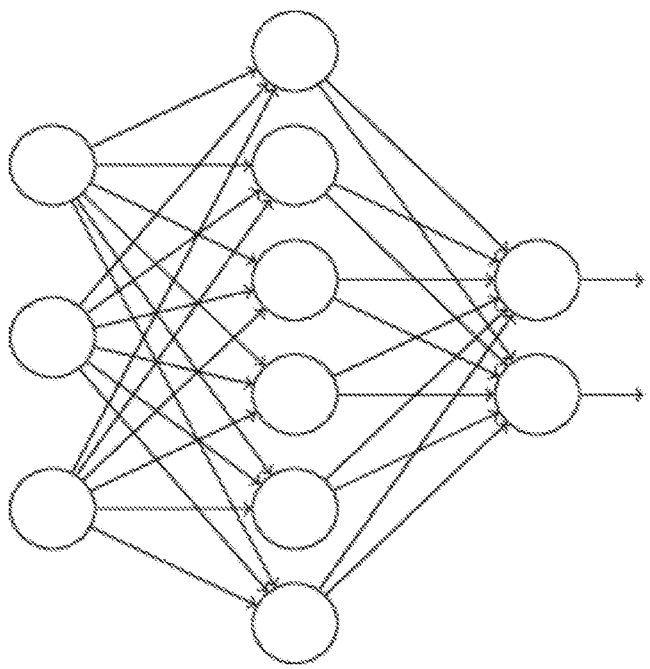
FIG. 2 is a schematic diagram showing a 3-layer neural network.

FIG. 2 is a schematic diagram showing a 3-layer neural network. As shown in FIG. 2, the input layer has 3 nodes, the hidden layer has 6 nodes, and the output layer has 2 nodes.

Figure 3:
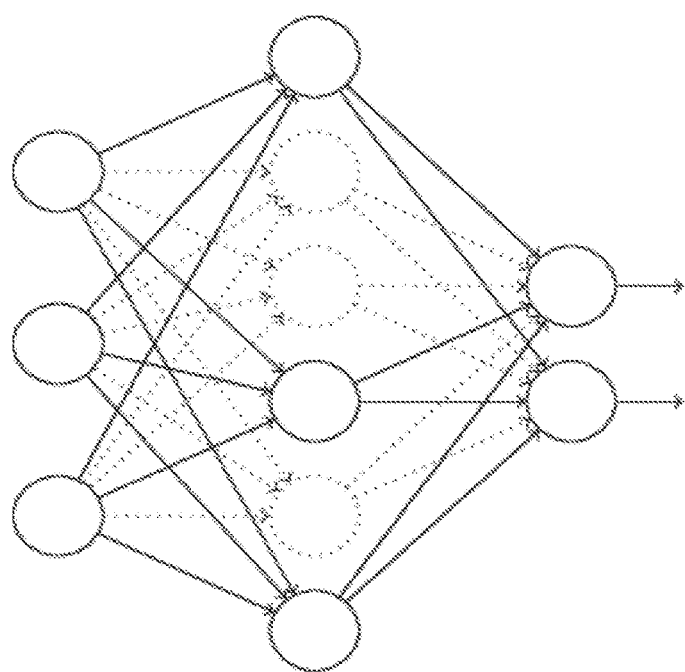
FIG. 3 is a schematic diagram showing a neural network added with a technology avoiding over-fit phenomenon.

FIG. 3 is a schematic diagram showing a neural network added with a technology avoiding the over-fit. As shown in FIG. 3, nodes drawn in dashed line refer to nodes hidden in this training. In other words, the weights of these nodes are not considered and updated in this training, and thus the weights are also drawn in dashed line. Nodes drawn in solid line refer to node retained in this training. In other words, the retaining nodes are used to train the data and the weights of these retaining nodes are updated.

In order to explain the process of generating the g2p model by training data with the neural network more clear, the comparison result between the models in which a portion of nodes are hidden and the modes in which all the nodes are used is shown in the following table, from which, the advantage of avoiding the over-fit is obvious.

TABLE 1

| models | whether to hide nodes | error rate |
| --- | --- | --- |
| 256-BLSTM | no | over-fit |
| 256-BLSTM | yes | 9.37% |
| 128-BLSTM + 64-BLSTM + 64-BLSTM | no | over-fit |
| 128-BLSTM + 64-BLSTM + 64-BLSTM | yes | 8.81% |
| 128-BLSTM + 128-BLSTM + 64-BLSTM | no | over-fit |
| 128-BLSTM + 128-BLSTM + 64-BLSTM | yes | 8.38% |

Referring to Table 1, only description of the hidden layers in these models is given. For example, the model 128-BLSTM+64-BLSTM+64-BLSTM indicates that the hidden layer has 3 BLSTM (Bidirectional Long-Short Term Memory) neural network models.

For the model 256-BLSTM, the number of parameters is 6.4 hundred thousand; for the model 128-BLSTM+64-BLSTM+64-BLSTM, the number of parameters is 4.4 hundred thousand; for the model 128-BLSTM+128-BLSTM+64-BLSTM, the number of parameters is 7.4 hundred thousand. The parameters of these models refer to weights of the nodes, and obviously, the number of parameters is increased compared to the training data. If the nodes are not hidden partially in training the model, the over-fit would occur in the model. By performing the model training with hiding a portion of nodes in the neural network, it may effectively avoid the over-fit and the model with good performance may be obtained.

It can be seen from the above description and experiments that the present disclosure at least has following advantages.

By training the g2p model with hiding a portion of nodes in the neural network, the number of layers in the network and the number of nodes in each layer can be increased properly in the model training, thus enhancing the generalization capability of the model and preventing the over-fit, and realizing using the large-scale neural network for the actual g2p model training.

With the method according to embodiments of the present disclosure, during performing a grapheme-to-phoneme conversion training by a neural network on each word in training data, nodes in a hidden layer of the neural network are screened randomly according to a preset node ratio so as to obtain retaining nodes for training each word; each word is trained with a sub-neural network corresponding to the retaining nodes and a weight of each retaining node of the sub-neural network is updated; and a mean processing is performed on the weights of the retaining nodes of all the sub-neural networks, so as to generate the grapheme-to-phoneme model. In this way, the g2p model is generated by training data with the deep neural network whose nodes are hidden dynamically, thus improving the learning capability and generalization capability of the g2p model generated and avoiding the over-fit phenomenon.

In order to realize above embodiments, the present disclosure also provides an apparatus for generating a g2p model based on AI.

Figure 4:
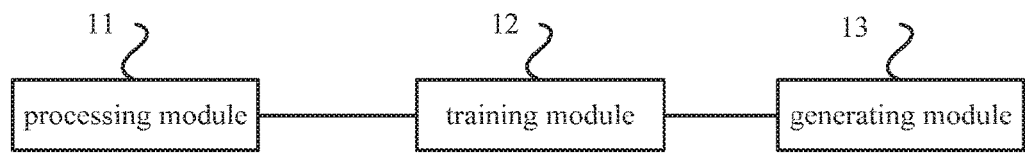
FIG. 4 is a block diagram of a computer-implemented apparatus for generating a g2p model based on AI according to an embodiment of the present disclosure.

FIG. 4 is a block diagram of a computer-implemented apparatus for generating a g2p model based on AI according to an embodiment of the present disclosure. As shown in FIG. 4, the apparatus includes a processing module 11, a training module 12 and a generating module 13.

The processing module 11 is configured to screen nodes in a hidden layer of a neural network randomly according to a preset node ratio so as to obtain retaining nodes for training each word, during performing a grapheme-to-phoneme conversion training by the neural network on each word in training data.

Specifically, the processing module 11 is configured to screen the nodes in the hidden layer of the neural network randomly according to the preset node ratio.

In an embodiment of the present disclosure, the processing module 11 is configured to hide a portion of nodes in each hidden layer of the neural network randomly according to a preset hiding ratio of nodes, such that a portion of nodes unhidden in each hidden layer of the neural network are used as the retaining nodes for training each word, in which the number of the nodes hidden corresponds to the preset hiding ratio of nodes.

In another embodiment, the processing module 11 is configured to retain a portion of nodes in each hidden layer of the neural network randomly according to a preset retaining ratio of nodes, in which the number of the nodes retained corresponds to the preset retaining ratio of nodes, and the nodes retained are used as the retaining nodes for training each word.

The training module 12 is configured to train each word with a sub-neural network corresponding to the retaining nodes and to update a weight of each retaining node of the sub-neural network.

The generating module 13 is configured to perform a mean processing on the weights of the retaining nodes of respective sub-neural networks, so as to generate the grapheme-to-phoneme model.

Based on the above embodiment, in another embodiment, the processing module 11 is further configured to adjust the number of layers in the neural network, the number of nodes in each layer and the preset node ratio according to the number of words in the training data.

It should be noted that, the above illustration for explaining the method for generating a g2p model based on AI can also be applied to the apparatus for generating a g2p model based on AI, which will not elaborated herein.

With the apparatus according to embodiments of the present disclosure, during performing a grapheme-to-phoneme conversion training by a neural network on each word in training data, nodes in a hidden layer of the neural network are screened randomly according to a preset node ratio so as to obtain retaining nodes for training each word; each word is trained with a sub-neural network corresponding to the retaining nodes and a weight of each retaining node of the sub-neural network is updated; and a mean processing is performed on the weights of the retaining nodes of all the sub-neural networks, so as to generate the grapheme-to-phoneme model. In this way, the g2p model is generated by training data with the deep neural network whose nodes are hidden dynamically, thus improving the learning capability and generalization capability of the g2p model generated and avoiding the over-fit phenomenon.

Embodiments of the present disclosure also provide a non-transitory computer-readable storage medium having stored therein instructions that, when executed by a processor of a device, causes the device to perform the above computer-implemented method for generating a grapheme-to-phoneme model based on artificial intelligence.

It should be noted that, in descriptions of the present disclosure, terms such as "first" and "second" are used herein for purposes of description and are not intended to indicate or imply relative importance or significance. In addition, in the description of the present disclosure, "a plurality of" relates to two or more than two, unless specified or limited otherwise.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented method for generating a grapheme-to-phoneme model based on artificial intelligence, performed by one or more computing devices and comprising:

during performing a grapheme-to-phoneme conversion training by a neural network on each word in training data, screening nodes in a hidden layer of the neural network randomly according to a preset node ratio so as to obtain retaining nodes for training each word;

training each word with a sub-neural network corresponding to the retaining nodes and updating a weight of each retaining node of the sub-neural network;

performing a mean processing on the weights of the retaining nodes of respective sub-neural networks, so as to generate the grapheme-to-phoneme model; and adjusting the number of layers in the neural network, the number of nodes in each layer and the preset node ratio according to the number of words in the training data.

2. The method according to claim 1, wherein screening nodes in a hidden layer of the neural network randomly according to a preset node ratio so as to obtain retaining nodes for training each word comprises:

hiding a portion of nodes in each hidden layer of the neural network randomly according to a preset hiding ratio of nodes, such that a portion of nodes unhidden in each hidden layer of the neural network are used as the retaining nodes for training each word, in which the number of the nodes hidden corresponds to the preset hiding ratio of nodes.

3. The method according to claim 1, wherein screening nodes in a hidden layer of the neural network randomly according to a preset node ratio so as to obtain retaining nodes for training each word comprises:

retaining a portion of nodes in each hidden layer of the neural network randomly according to a preset retaining ratio of nodes, and the nodes retained are used as the retaining nodes for training each word, in which the number of the nodes retained corresponds to the preset retaining ratio of nodes.

4. A computer-implemented apparatus for generating a grapheme-to-phoneme model based on artificial intelligence, comprising one or more computing devices configured to execute one or more software modules, the one or more software modules comprising:

a processing module, configured to screen nodes in a hidden layer of a neural network randomly according to a preset node ratio so as to obtain retaining nodes for training each word, during performing a grapheme-to-phoneme conversion training by the neural network on each word in training data;

a training module, configured to train each word with a sub-neural network corresponding to the retaining nodes and to update a weight of each retaining node of the sub-neural network; and a generating module, configured to perform a mean processing on the weights of the retaining nodes of respective sub-neural networks, so as to generate the grapheme-to-phoneme model;

wherein the processing module is further configured to:
adjust the number of layers in the neural network, the number of nodes in each layer and the preset node ratio according to the number of words in the training data.

5. The apparatus according to claim 4, wherein the processing module is configured to:
hide a portion of nodes in each hidden layer of the neural network randomly according to a preset hiding ratio of nodes, such that a portion of nodes unhidden in each hidden layer of the neural network are used as the retaining nodes for training each word, in which the number of the nodes hidden corresponds to the preset hiding ratio of nodes.

6. The apparatus according to claim 4, wherein the processing module is configured to:
retain a portion of nodes in each hidden layer of the neural network randomly according to a preset retaining ratio of nodes, and the nodes retained are used as the retaining nodes for training each word, in which the number of the nodes retained corresponds to the preset retaining ratio of nodes.

7. A non-transitory computer-readable storage medium having stored therein instructions that, when executed by a processor of a device, causes the device to perform a computer-implemented method for generating a grapheme-to-phoneme model based on artificial intelligence, the computer-implemented method comprising:
during performing a grapheme-to-phoneme conversion training by a neural network on each word in training data, screening nodes in a hidden layer of the neural network randomly according to a preset node ratio so as to obtain retaining nodes for training each word;

training each word with a sub-neural network corresponding to the retaining nodes and updating a weight of each retaining node of the sub-neural network; and performing a mean processing on the weights of the retaining nodes of respective sub-neural networks, so as to generate the grapheme-to-phoneme model;

adjusting the number of layers in the neural network, the number of nodes in each layer and the preset node ratio according to the number of words in the training data.

8. The non-transitory computer-readable storage medium according to claim 7, wherein screening nodes in a hidden layer of the neural network randomly according to a preset node ratio so as to obtain retaining nodes for training each word comprises:
hiding a portion of nodes in each hidden layer of the neural network randomly according to a preset hiding ratio of nodes, such that a portion of nodes unhidden in each hidden layer of the neural network are used as the retaining nodes for training each word, in which the number of the nodes hidden corresponds to the preset hiding ratio of nodes.

9. The non-transitory computer-readable storage medium according to claim 7, wherein screening nodes in a hidden layer of the neural network randomly according to a preset node ratio so as to obtain retaining nodes for training each word comprises:
retaining a portion of nodes in each hidden layer of the neural network randomly according to a preset retaining ratio of nodes, and the nodes retained are used as the retaining nodes for training each word, in which the number of the nodes retained corresponds to the preset retaining ratio of nodes.

* * * * *